Figure 9:
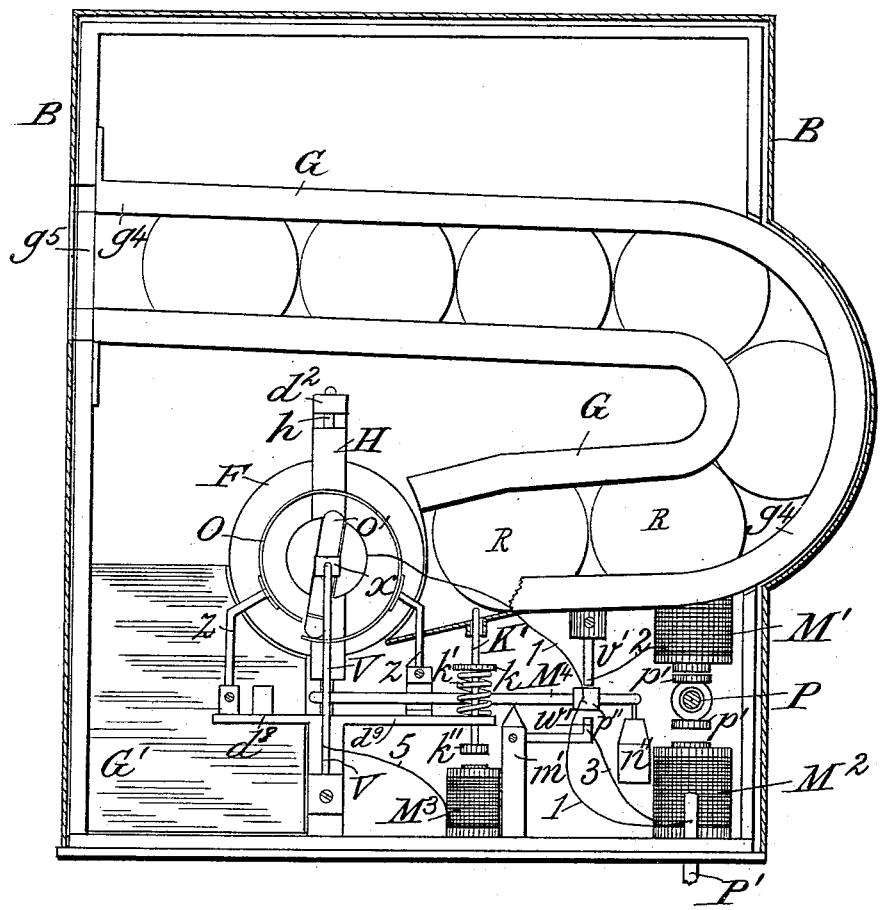

No. 620,537.  
W. F. BROWNE.  
COIN CONTROLLED MECHANISM FOR ELECTRIC METERS.  
(Application filed Dec. 28, 1897.)  
(No Model.)  
Patented Feb. 28, 1899.  
5 Sheets—Sheet 1.
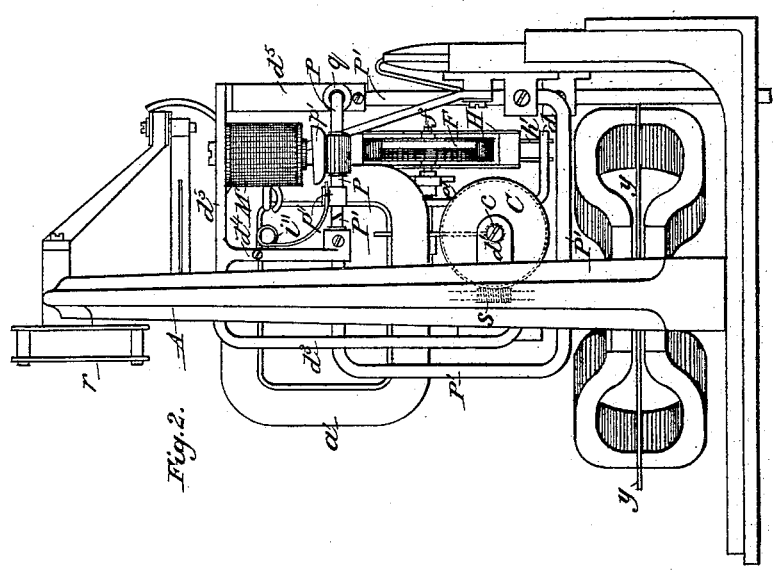
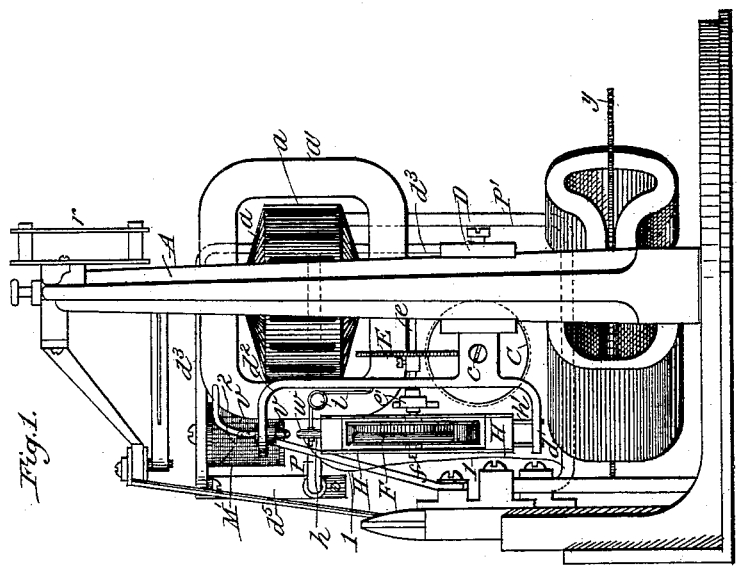
Witnesses  
Jas. H. Griffin.  
F. H. Schott
Inventor  
Wm. Frank Browne  
By E. B. Clark  
Attorney
THE NORRIS PETERS CO., PHOTO-LITHO., WASHINGTON, D. C.

No. 620,537. Patented Feb. 28, 1899.
W. F. BROWNE.
COIN CONTROLLED MECHANISM FOR ELECTRIC METERS.
(Application filed Dec. 28, 1897.)
(No Model.) 5 Sheets—Sheet 2.
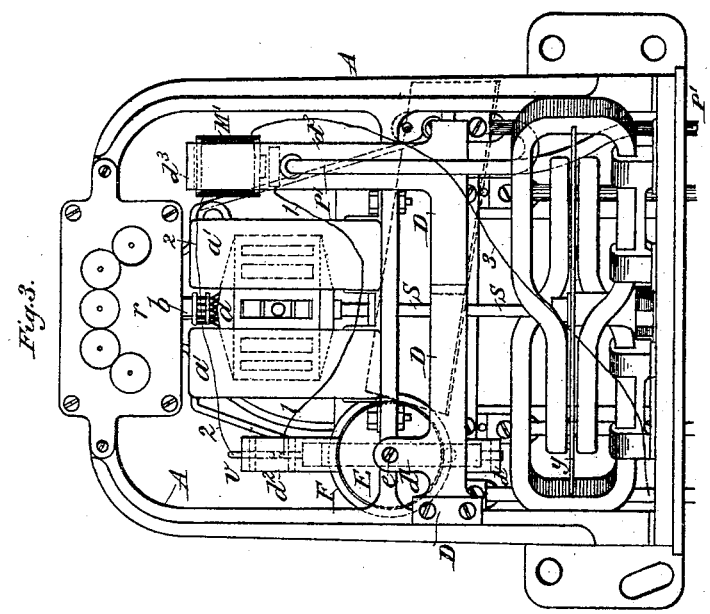
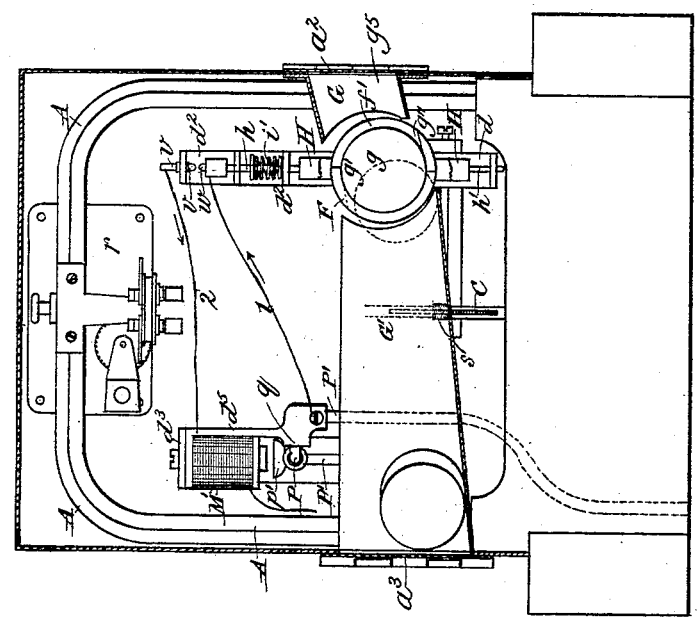
Witnesses
Jas. H. Griffin
F. H. Schott
Inventor
Wm Frank Browne
By E. B. Clark
Attorney
THE NORRIS PETERS CO., PHOTO-LITHO., WASHINGTON, D. C.

No. 620,537. Patented Feb. 28, 1899.
W. F. BROWNE.
COIN CONTROLLED MECHANISM FOR ELECTRIC METERS.
(Application filed Dec. 28, 1897.)
(No Model.) 5 Sheets—Sheet 3.
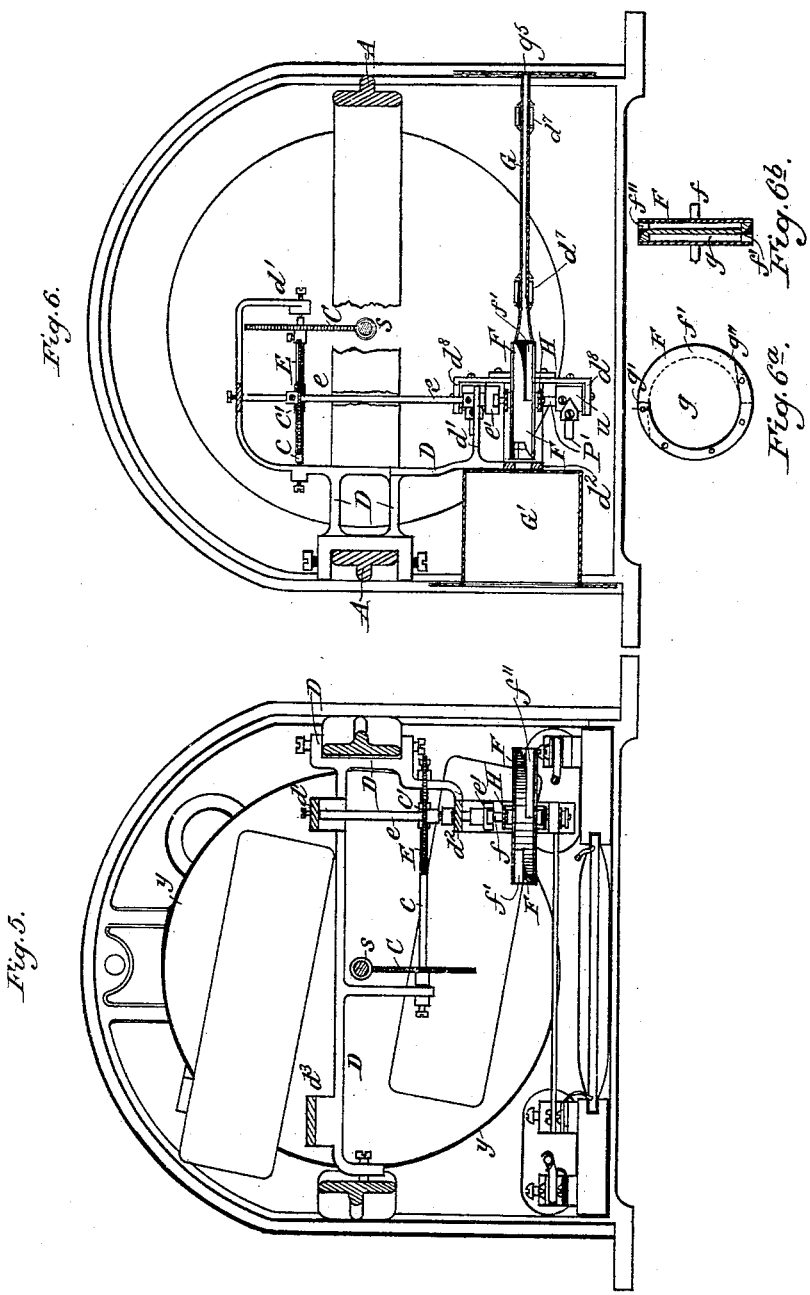

No. 620,537. Patented Feb. 28, 1899.
W. F. BROWNE.
COIN CONTROLLED MECHANISM FOR ELECTRIC METERS.
(Application filed Dec. 28, 1897.)
(No Model.) 5 Sheets—Sheet 4.
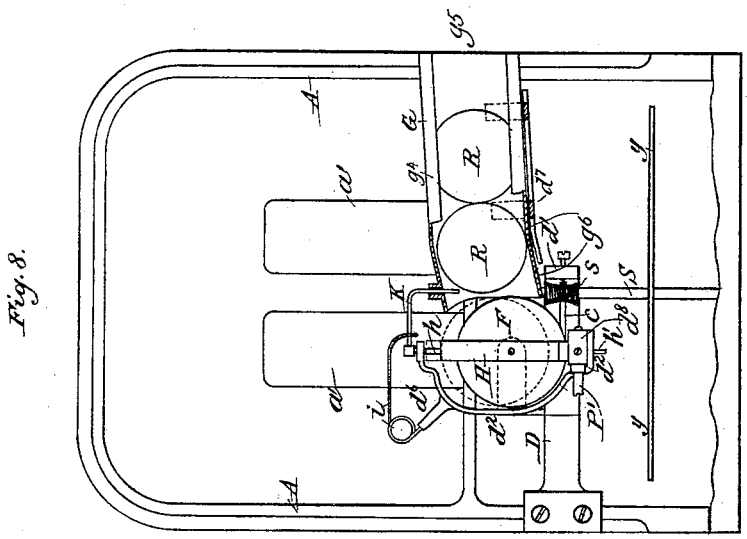
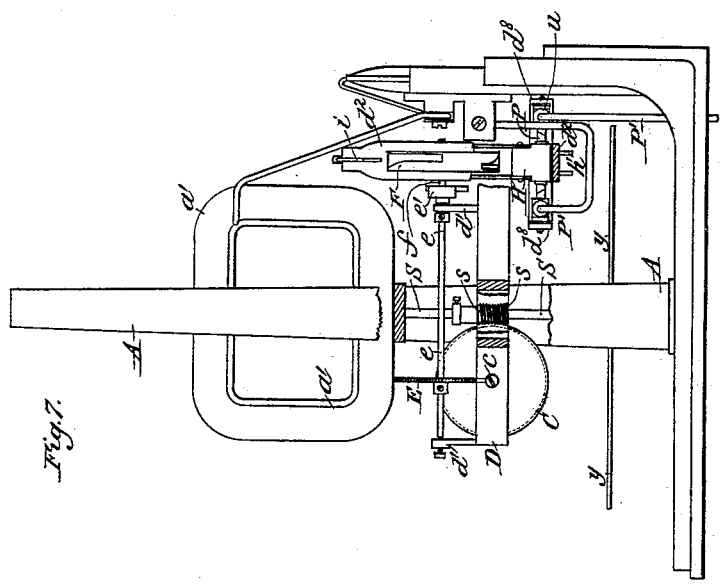
Witnesses
Jas. H. Griffin
F. H. Schott
Inventor
Wm. Frank Browne
By E. B. Clark
Attorney
THE NORRIS PETERS CO., PHOTO-LITHO., WASHINGTON, D. C.

No. 620,537. Patented Feb. 28, 1899.
W. F. BROWNE.
COIN CONTROLLED MECHANISM FOR ELECTRIC METERS.
(Application filed Dec. 28, 1897.)
(No Model.) 5 Sheets—Sheet 5.

Witnesses
J. H. Griffin
F. H. Schott

Inventor
Wm. Frank Browne
By E. B. Clark
Attorney

UNITED STATES PATENT OFFICE.

WILLIAM FRANK BROWNE, OF NEW YORK, N. Y., ASSIGNOR OF ONE-HALF TO CHARLES R. KNAPP, OF SOMERVILLE, NEW JERSEY.

COIN-CONTROLLED MECHANISM FOR ELECTRIC METERS.

SPECIFICATION forming part of Letters Patent No. 620,537, dated February 28, 1899.

Application filed December 28, 1897. Serial No. 664,055. (No model.)

*To all whom it may concern:*

Be it known that I, WILLIAM FRANK BROWNE, a citizen of the United States, residing at New York city, in the county of New York and State of New York, have invented certain new and useful Improvements in Prepayment Coin-Controlled Mechanism for Electric Meters; and I do hereby declare the following to be a full, clear, and exact description of the invention, such as will enable others skilled in the art to which it appertains to make and use the same.

This invention relates to a prepayment coin-controlled mechanism for electric meters and embraces certain improvements in the construction and arrangement of the devices forming the subject of my prior patent, No. 596,012, dated December 21, 1897.

The object of my invention is to provide for arranging and placing the coin-controlled mechanism by means of which the current is automatically metered or shut off within the ordinary meter-case and so supported on an independent frame that it can be readily placed in position or removed without interfering with any of the mechanism or devices of the meter.

Another object is to provide improved devices for automatically opening the switch or contact-section in the electric-light circuit within the meter.

Another object is to provide improved devices, as a detent and its operating mechanism, for releasing one coin at a time in the coin-conduit and depositing it in the coin-wheel as required for closing the circuit or keeping it closed to maintain the light.

My invention is herein illustrated in connection with an electric-light meter, and the mechanism, as shown, is adapted (by the weight of a coin) for starting the meter and permitting it to operate till a predetermined number of watt-hours of electric current have been metered to the customer, also for stopping the flow of current when the value of the prepayment-coin in watt-hours has been metered or consumed. For example, electric-light current is now sold at the rate of one cent per sixteen (16) candle-power lamp per hour or one dollar ($1.00) per lamp for one hundred hours. At this rate two lamps could be run fifty hours or ten lamps ten hours for one dollar, ($1.00.) Now I proportion the system of toothed wheels in my mechanism so that the last wheel of the series when but one lamp is on will revolve once in one hundred hours or one-half around in fifty hours, the one-half turn measuring current equal to the value of fifty cents per lamp for fifty hours, while one revolution of the wheel measures current equal to the value of one hundred cents for one hundred hours. The shaft of the meter revolves once in thirty seconds when a sixteen-candle-power incandescent lamp is turned on or twice in one minute, while with two sixteen-candle-power lamps or one thirty-two-candle-power lamp it revolves four times in one minute. It will show a corresponding increase for each lamp turned on.

The above principles of construction and operation are embodied in my mechanism.

The matter constituting my invention will be defined in the claims.

I will now describe the details of construction and operation of my invention by reference to the accompanying drawings, in which—

Figure 1 represents a side elevation of a meter and my coin-controlled mechanism, the case being removed, as seen looking from the left-hand side. Fig. 2 represents a similar elevation thereof as seen looking from the right-hand side. Fig. 3 represents a front elevation of the meter and my mechanism. Fig. 4 represents a rear elevation thereof, the case being in section and part of the meter devices being removed. Fig. 5 represents a horizontal section through the frame below the motor of the meter and showing my devices in top plan view. Fig. 6 represents a similar view of a modified arrangement of my coin-controlled devices. Fig. 6$^a$ represents a side elevation of the coin-pocket wheel with one side plate removed. Fig. 6$^b$ represents a transverse section thereof. Fig. 7 represents a side elevation of part of the meter devices and of my coin-controlled devices in the same modified arrangement as that shown in Fig. 6. Fig 8 represents an elevation of my devices as seen looking toward the rear of the meter. Fig. 9 represents a similar elevation of my coin-controlled devices, showing additional features and details of construction.

Figure 10:
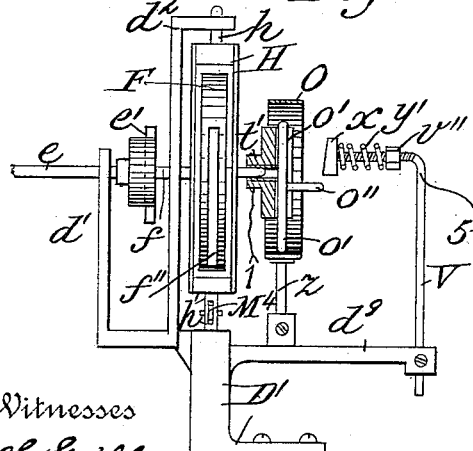
Figure 11:
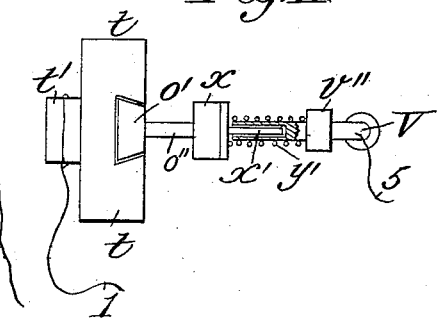

Fig. 10 represents an elevation of the coin-pocket wheel, looking toward the edge thereof and at right angles to the view shown in Fig. 9. Fig. 11 represents a top plan view of certain details of construction shown in Fig. 10.

A suitable motor-meter and my prepayment coin-controlled mechanism are inclosed in a suitable case, the meter being supported by the frame A and the base-plate and my coin-controlled mechanism by the frame D and its various standards, brackets, and hangers, as will be hereinafter more specifically described.

I will first describe the construction and arrangement of my mechanism as shown in Figs. 1 to 5, inclusive, and then the construction and arrangement shown in the remaining figures of the drawings.

The principal parts of the meter are well known, and consist of the armature $a$ on shaft S, coils $a'$, commutator $b$, register $r$, and retarder $y$. Upon the armature-shaft S is secured or formed a suitable worm-gear $s$, adapted to engage a toothed wheel C. In the device here shown the wheel C is made with one hundred and twenty teeth and is mounted on a shaft $c$, supported in journals in the bracket-frame D. To shaft $c$ is secured the worm $c'$, Fig. 5, for engaging the toothed wheel E, which is secured to shaft $e$, supported in journals in uprights $d'$ and $d^2$ of frame D. The gear-wheel E is made with one hundred teeth, and its shaft $e$ is coupled by a yielding coupling device $e'$ directly to the axle $f$ or the revolving coin-pocket wheel F, journaled in the yielding frame H. The yielding coupling device may consist of a disk provided in one face with a transverse groove, into which is fitted to slide freely a bar, so that the parts shall remain coupled, while permitting the frame H and its coin-pocket wheel F to be lowered when a coin is deposited in the wheel and to be raised when the coin is discharged therefrom. This device is shown and described in detail in my above-mentioned patent.

The coin-pocket wheel F is provided with axles $f$, journaled on each side in the frame H, Figs. 2 and 5, so that the wheel is free to rotate. The wheel F is preferably constructed with the coin-pockets $f'\ f''$, one on each side of a suitable partition $g$, and such pockets have interior curved walls. (Shown by the full and the dotted lines in Fig. 6ª.) These curved walls (the bottoms of the pockets) extend from the periphery of the wheel at the points $g'$ and $g''$ inward beyond the center a distance equal to one-half of the diameter of the coin R, so that the coin shall rest centrally in the wheel, and therefore exert no leverage on the same during its revolution. By virtue of this interior curved wall the coin is retained in the pocket till the wheel has made one-half a revolution. Each pocket is substantially of the same diameter as a fifty-cent piece, but sufficiently large to allow the coin to freely enter and be discharged therefrom without binding. In practice the pockets will be made of a suitable size to receive any desired coin which is to be used for operating the mechanism. During the one-half revolution of the wheel F the coin simply turns with the pocket till it is discharged at the bottom.

The opening of the pocket extends between the points $g'$ and $g''$ and is long enough to readily receive the coin from the conduit and to let it roll out at the end of the one-half revolution of the wheel. The pockets overlap each other, and the interior wall of each is beveled from the periphery inward, as shown in Figs. 5 and 6, so as to leave the opening wide enough to readily receive the coin from the conduit.

The yieldingly-supported frame H is constructed with two side bars and with guide-rods $h\ h'$ at the upper and lower ends, the upper rod sliding in a guide socket or bearing in standard $d^2$ and the lower rod sliding in a bearing in arm $d$ of frame D. A disk is secured to the upper rod $h$ as a bearing for the coiled spring $i'$ around the rod, as shown in Fig. 4. The spring $i'$ bears at its lower end on a bracket of standard $d^2$ and acts to keep the frame and coin-wheel in a raised position when there is no coin in the wheel. Instead of the coiled spring $i'$, as shown in Fig. 4, I may use the spring $i$, attached at one end to the standard $d^2$ and at the other end to the rod $h$ of the frame H, as shown in Fig. 1. Another slight modification of the arrangement and connection of the lifting-spring $i$ is shown in Fig. 8. The coin-conduit G extends from the slot $g^5$ in the wall of the case to the wheel F and is supported by the brackets $d^7$, Figs. 6 and 8, secured to the frame D or other convenient means. One side of the conduit may have flanges $g^4$ and be left open between them for removing foreign substances, as shown in Fig. 9.

In Figs. 1 to 4 the frame and coin-pocket wheel (containing a coin) are represented in the depressed position with the main electric circuit P P' closed. In this mechanism I provide an electromagnet for opening the switch or contact-section P of the main conductor, and for this purpose I provide certain small wires and contact-points for conducting a current from the main conductor into said electromagnet when proper contact is made by the rise of the yieldingly-supported coin-wheel and frame. The upper end of the guide-rod $h$, Figs. 1 and 4, is provided with a contact-point $w$, which is suitably insulated from the rod. A second contact-point or binding-post $v$ is supported in the inwardly-turned end of the standard $d^2$ (in which it is insulated) just above the contact-point $w$. An electromagnet M' is suspended from the horizontal arm of the standard $d^3$ of the frame D, so that its core at the lower end shall be just above the armature $p'$, secured to the swinging contact-section or switch P, Figs. 2 and 4. The swinging contact-section P is pivotally connected at $q$ in a socket or fitting, with which socket also connects the main conductor P' and which is supported by the hanger $d^5$, attached to the standard and arm $d^3$. Another hanger $d^4$, extending downward, Fig. 2, supports another portion of the main conductor P', which portion has a beveled end adapted to make contact with a similar beveled end of the movable section P. Upon the section P is secured the armature $p'$, directly under the core of the electromagnet M'. This armature may be placed near the swinging connection of the section P and the magnet directly above it, so that the magnet when attracting the armature will open or raise the free end of section P to a greater extent than would otherwise be possible, so as to prevent the possibility of arcing. To avoid arcing, I also make the contact-section P entirely detached from the main conductor and adapted to be raised therefrom, as shown in Fig. 7. The section P will ordinarily fall and close the circuit by gravity; but in order to secure quick and positive action I provide a spring $i''$, Fig. 2, connecting by a screw to the hanger $d^4$ and bearing at its free end upon the block of insulating material $p''$ on the section P, as shown in Fig. 2. A small wire 1 connects with the main conductor P' and with insulated point $w$, Figs. 1 and 4, and a second small wire 2 connects the contact-post $v$ with the electromagnet M' for passing a current into said magnet, when the points $w$ and $v$ are caused to make contact by the rise of frame H, when the coin is discharged from the wheel F.

A more simple and compact arrangement of my coin-controlled mechanism, the conduit, and the supporting-frame D are illustrated in Figs. 6, 7, and 8. In this modified construction substantially all the parts heretofore described are used excepting the electromagnet and its immediate connections for raising or opening the contact-section or switch P; but the parts are more compactly and conveniently arranged and the supporting-frame D is simplified, so that it can be readily inserted into the meter-case with all the mechanism and attached simply to one upright of the frame A by suitable binding-screws, as shown in Fig. 6.

The toothed wheel C and the worm $c'$ are secured to shaft $c$, which is supported by screw-threaded pivots in the frame D and its arm $d'$. The second toothed wheel E, which meshes with the worm $c'$, is secured on shaft $e$, supported in journals, or by pivotal pins in the standards $d'$ of the frame D, and said shaft $e$ in this arrangement is made sufficiently long to permit of any desired kind of yielding couple to the axle $f$ of the coin-wheel F. The standard $d^2$ connects with the frame D and forms a supporting-guide for the yielding frame H both at top and bottom. The standard $d^2$ is also provided with a vertical slot to permit the passage of a coin as it is discharged from wheel F into the collecting-box G', as shown in Fig. 6. The standard $d^2$ is provided at its upper end with an inclined stud $d^6$, to which is secured the lifting-spring $i$, which connects at its outer end to a detent-rod K, which is secured at its upper end to the guide-rod $h$ of the frame H. The detent-rod K is bent downward and passes through an opening in the upper edge wall of the coin-conduit G, so as to project down just in front of the coin R, which is to be retained in the conduit until the coin previously deposited in the wheel has been discharged therefrom. The lower end portion $g^6$ of the bottom of the conduit is inclined downward and is at an angle to the outer portion thereof, as shown in Fig. 8, so that when the inner coin R is released by the withdrawal of detent K when the coin-wheel F rises said coin R will quickly roll downward into the adjacent pocket, thereby forcing the wheel and frame downward and the detent K downward, so as to arrest the succeeding coin before it can roll down to the coin-wheel. This construction and arrangement are quite important for permitting a number of coins to be stored in the conduit G and be deposited one at a time in the coin-wheel before it has a chance to fully rise and open the electric circuit. The coin-conduit may be made long and curved, as shown in Fig. 9, so as to hold a greater number of coins. The conduit G, Fig. 8, is supported by brackets $d^7$, which will in practice connect with the main frame D, though the connection is not here shown.

The movable contact-section P, Fig. 7, is here shown connecting with or passing through the lower end of the yielding frame H, in which it will be properly insulated, and both ends are beveled, as shown, for making contact with the beveled ends of the main conductor P'. The ends of the conductor P' are connected with suitable fittings $u$, which are secured to the bracket-support $d^8$, and the ends which are to make contact with the movable section P' are beveled. This construction and arrangement of the contact-section are very simple and effective.

The coin-pocket wheel F is shown in Figs. 6ª and 6ᵇ and is constructed as above described.

Other modifications and additional devices of my mechanism are shown in Figs. 9, 10, and 11 detached from the meter-case, but which may in practice be placed therein. Two electromagnets are used for opening and closing the switch or contact-section. An electromagnet is also used for operating the detent K'. These parts and their connecting devices are constructed as follows: To the outer end of the axle $f$ is rigidly secured the metallic disk $t$, having a hub $t'$, insulating material being interposed between said axle and disk and hub. A small conducting-wire 1, leading from one of the main conductors, is wound upon the hub $t'$ or is caused to make contact therewith by any well-known means for conducting current to the sliding contact-bar $o'$. A transverse groove of dovetail shape or other form is made in the hub or disk $t$, and within it is placed the sliding contact-bar $o'$, adapted to slide freely therein and provided with the outwardly-projecting contact-point $o''$, which is adapted to make contact with the yielding plate $x$. The bar $o'$ is supported and guided at its ends by the cam-shaped guide O, which is supported upon the insulated posts $z\ z$ on the bracket $d^9$ of the frame D'.

In a suitable position beyond the contact-bar $o'$ is fixed the insulated standard V in bracket $d^9$ and having its upper end bent inward to near the center of the disk $t$, as shown in Fig. 10. This inwardly-bent end is provided with a longitudinal socket which receives the stem $x'$ of the contact-plate $x$. This end is screw-threaded and is provided with a screw-threaded regulating-nut $v''$. A coiled spring $y'$ is arranged to bear on the nut $v''$ and the contact-plate $x$, so as to force the latter slightly outward, where it is held in proper position to be brushed or struck by the contact-point $o''$ as it passes downward. The face of the contact-plate $x$ is inclined to its stem, so that the point $o''$ shall press upon it and make good contact. The tension of the spring $y'$ is properly regulated by the nut $v''$.

A small wire 5 connects the standard V with the electromagnet $M^3$ for operating the detent K'. The small wire 1, which leads from the main conductor P', connects first with the insulated block $p''$ and then continues to the hub $t'$ for the purpose above described.

The lifting-lever $M^4$ rests upon the fulcrum $m'$ and is pivotally connected to the guide-rod $h'$ of the frame H and has a counterbalance-weight $n''$ connected to its outer end. The contact-block $p''$, properly insulated, is secured to lever $M^4$ between the contact-pins $v'$ and $w'$, projecting, respectively, above and below the same, as shown in Fig. 9. A small wire 2 connects the pin $v'$ with the electromagnet M', and another small wire 3 connects the contact-pin $w'$ with the electromagnet $M^2$. These electromagnets M' and $M^2$ are suitably supported above and below the contact-section P of the main conductor, so that their cores shall be in position to attract the armatures $p'\ p'$ on said contact-section. The detent-rod K' is provided with a disk $k$ and a coiled spring $k'$, by means of which it is supported on the bracket $d^9$, and to the lower end of said rod is secured the armature $k''$ just above the core of the electromagnet $M^3$. The detent-rod K' passes through an opening in the bottom of conduit G and acts as a stop to coin R or a number of such coin in the conduit, as shown in Fig. 9.

A door $a^2$, Fig. 4, is hinged to the case for closing the conduit G, and another door $a^3$ is hinged to the opposite side of the case for closing the collection-box G'. In practice such doors will be locked and the key of the conduit carried by the customer and the key of the collection-box held by the company or person supplying the electric current.

In case current is sold at a rate or price different from that above described then my gear-wheels, coin-pocket wheel, connections, &c., will be so proportioned and constructed as to correctly operate with coins of different denominations, according to the value of current for a sixteen-candle-power lamp per hour or the value of current for heat or power.

The meter and my coin-controlled mechanism, constructed as above described and shown in the drawings, being set in position with the usual electrical connections, the frame H and wheel F will be normally in the raised position with the switch or contact-section P open and the circuit broken. Now if a coin, as a silver half-dollar, be deposited in the pocket-wheel F the frame and wheel will be depressed, thereby causing the switch or movable section to make contact with the stationary conductor and pass current to the meter.

A lamp being turned on, the operation of the motor-meter turns shaft S, with worm $s$, thus transmitting motion through the gearing to the coin-pocket wheel F, which will continue to revolve so long as the lamp or lamps remain turned on.

When current has been used to the extent of one sixteen-candle-power lamp for fifty (50) hours, the wheel F will have revolved one-half around and the coin will roll out into the collection-box G', permitting the frame H to rise and break the circuit in the main conductor P', thereby extinguishing the light.

When a coin drops into the pocket of wheel F, it is depressed, thereby breaking contact at the points $v$ and $w$, shutting off current from the electromagnet M', which thus releases the armature $p'$ on the switch or contact-section P, and such section is forced by the spring $i''$ into close contact with the beveled end of the conductor P', as shown in Fig. 2. When the coin rolls out of the pocket, the wheel and frame are automatically raised by the spring $i$, Fig. 1, or the spring $i'$, Fig. 4, causing the points $v$ and $w$ to make contact, thereby passing a current through the small wires 1 and 2 into the electromagnet M', energizing it, and causing it to attract the armature $p'$ and open the switch, thereby shutting off current to the electric lights. When light is again desired, another coin must be deposited in the upper pocket of the wheel, and it may be deposited by hand in the short conduit G, Fig. 4, or, if already in the long conduit G, Figs. 8 and 9, it may be released by detent K or K' and caused to roll into the wheel before the lights are extinguished.

The electromagnet may be dispensed with and the simple mechanism shown in Figs. 6, 7, and 8 used, in which case the weight of the coin in the wheel F depresses it and forces the section P, Fig. 7, into contact with the ends of the conductor P'. When a coin rolls out and no other is immediately admitted to the wheel, the spring $i$, Fig. 8, raises the frame and wheel and breaks the circuit in the main conductor. In case another coin, as R, is in the conduit G the raising of the frame and the detent K by spring $i$ will release coin R and permit it to roll quickly down the incline $g^6$ into the coin-wheel, thereby depressing it and closing the main circuit. The frame and wheel are so quickly depressed that the detent K is forced down into the conduit, so as to act as a stop to the succeeding coin before it reaches the coin-wheel.

Referring now to the modified construction shown in Figs. 9, 10, and 11, the operation is as follows: During the one-half revolution of the wheel F and its hub or disk $t$ the sliding contact-bar $o'$ is guided and supported at one end by the interior surface of the cam O. After one-fourth revolution of the hub the bar $o'$ will slide so that its opposite end will pass down and rest upon the interior surface of the cam-guide O, which will support it until the one-half revolution is nearly completed; but a short time before the completion of such one-half revolution the bar $o'$ will pass off from the inner end of the cam-guide O and drop down upon the outer end of such guide, as shown in Fig. 9. As the bar drops its contact-point $o''$ will bear against the contact-plate $x$, making electrical contact therewith. During this momentary contact a current is passed through the small wire 5 into the electromagnet $M^3$, energizing it and causing it to attract the armature $k''$, thereby retracting the detent-rod $K'$ from the conduit G and releasing the coin R, so that it will roll into the upper empty pocket of the wheel. Immediately after the point $o''$ passes plate $x$ the circuit will be broken and the detent again pushed up into the conduit by a spring $k'$ and will hold in place the succeeding coin in said conduit. The continued movement of the wheel F until one-half revolution is completed will now permit the first coin to roll out therefrom into the collection-box G'. Since the second coin was admitted to the wheel before the first coin had rolled out, the circuit will not be broken and the lights not extinguished. All the coins in the conduit will thus be fed down into the wheel until they are exhausted before electrical contact will be broken and the lights extinguished. The depression of the wheel and its frame by the weight of a coin depresses the long arm of lever $M^4$ and causes its contact-block $p''$ to make contact with the post $v'$, thereby permitting current to pass through the small wires 1 and 2 into the electromagnet $M'$, which will raise the contact-section P into electrical contact in the main circuit. When the coin rolls out from wheel F and no other is admitted, the frame and wheel are raised by the weighted lever $M^4$, and the block $p''$ then makes contact with the pin or post $w'$, permitting current to pass over the small wires 1 and 3 into the electromagnet $M^2$, which opens the switch or section P in the main conductor and shuts off current from the meter and lamps.

Having described my invention, what I claim, and desire to secure by Letters Patent, is—

1. In coin-controlled mechanism, the yieldingly-supported frame for the coin-wheel, and having a contact-point, another contact-point adjacent thereto, means for moving the frame to bring said points in contact, a movable contact-section or switch in the main circuit, an electromagnet adjacent thereto, adapted to operate it, and electrical connections between the main circuit, the contact-points and said magnet, substantially as described.

2. The combination with the meter, of a rotary coin-pocket wheel in a yielding support, a switch for opening and closing the circuit to the meter, suitable gearing connecting said wheel with the rotary shaft of the meter, means for automatically raising said yielding support, an electromagnet arranged to operate said switch and suitable electric connections, whereby a coin inserted in the wheel, will, by its weight, operate said yielding support to close the circuit, and thereby meter current to the customer, substantially as described.

3. In coin-controlled mechanism, the yieldingly-supported coin-pocket wheel adapted to be moved downward by the weight of a coin, and means for automatically moving it upward on discharge of the coin, in combination with the coin-conduit, a detent projecting into said conduit and holding the coin therein, and an electromagnet arranged to operate said detent to release one of the coin at the proper time, and suitable electrical connections for such purpose.

4. In coin-controlled mechanism, the combination with the yieldingly-supported coin-holder, of the conduit adapted to hold a number of coin, a detent projecting into said conduit for holding the coin therein, an electromagnet arranged to operate the detent to release one of the coin at a time and suitable electrical connections, substantially as described.

5. In coin-controlled mechanism, the combination with the yieldingly-supported revoluble coin-holder, of a disk secured to the axle of said holder, a sliding contact-bar, $o'$, having a stud and engaging with said disk, the fixed eccentric guide O, for said bar, a yielding contact-plate, adjacent to said bar and stud, a coin-conduit, a detent-rod projecting therein and having an armature, an electromagnet adapted to operate said detent and electrical connections, substantially as described.

In testimony whereof I affix my signature in presence of two witnesses.

WILLIAM FRANK BROWNE.

Witnesses:
CHARLES R. KNAPP,
E. B. CLARK.